(12) United States Patent
Yang et al.

(10) Patent No.: US 12,030,541 B2
(45) Date of Patent: Jul. 9, 2024

(54) METHOD AND SYSTEM FOR STATE FEEDBACK PREDICTIVE CONTROL OF HIGH-SPEED TRAIN BASED ON FORECAST ERROR

(71) Applicant: East China Jiaotong University, Nanchang (CN)

(72) Inventors: Hui Yang, Nanchang (CN); Ling Liu, Fengtai District (CN); Yating Fu, Nanchang (CN); Yinghe Tong, Nanchang (CN); Zhongqi Li, Nanchang (CN); Junfeng Cui, Beijing (CN)

(73) Assignees: East China Jiaotong University (CN); CRSC Research & Design Institute Group Co., Ltd. (CN)

(*) Notice: Subject to any disclaimer, the term of this patent is extended or adjusted under 35 U.S.C. 154(b) by 720 days.

(21) Appl. No.: 17/153,478

(22) Filed: Jan. 20, 2021

(65) Prior Publication Data
US 2021/0331727 A1 Oct. 28, 2021

(30) Foreign Application Priority Data
Apr. 24, 2020 (CN) .......................... 202010331363.9

(51) Int. Cl.
*B61L 27/04* (2006.01)
*B61L 25/02* (2006.01)
(Continued)

(52) U.S. Cl.
CPC ............ *B61L 27/04* (2013.01); *B61L 25/021* (2013.01); *G05D 1/0223* (2013.01); *G06N 5/04* (2013.01); *G06N 20/00* (2019.01); *B61L 2201/00* (2013.01)

(58) Field of Classification Search
CPC .... B61L 27/04; B61L 25/021; B61L 2201/00; B61L 15/0072; B61L 27/20; B61L 27/40;
(Continued)

(56) References Cited

U.S. PATENT DOCUMENTS

| 8,630,757 B2 * | 1/2014 | Daum ..................... B61L 27/16 701/19 |
| 8,676,410 B2 * | 3/2014 | Houpt ..................... B61L 27/16 701/19 |

(Continued)

*Primary Examiner* — Mohamed Abdo Algehaim
(74) *Attorney, Agent, or Firm* — Dinsmore & Shohl LLP

(57) ABSTRACT

The invention discloses a method and a system for state feedback predictive control of a high-speed train based on a forecast error. The method comprises: obtaining a speed prediction model of a high-speed train $$\hat{y}_{k+p} = CA^p x_k + \sum_{i=1}^{p} CA^{i-1} Bu_{k+p-i};$$

predicting speeds of the train at times k and k+p according to the speed prediction model; obtaining an actual speed output value of the train; determining a speed prediction error at time k according to the prediction speed of the train and the actual speed output value of the train; correcting a prediction speed of the train at time k+p, according to the speed prediction error, to obtain a corrected prediction speed of the train; calculating a control force $u_k$ of the train according to $u_k = \lambda^{-1}(p)[y_{k+p}{}^r - y_k - Kx_k + \hat{y}_k]$; and applying a control force to the train based on the control force $u_k$. The disclosure may have features of strong adaptability and easy calculation, and achieve high-precision tracking of train speed.

4 Claims, 5 Drawing Sheets

(51) Int. Cl.
*G05D 1/00* (2006.01)
*G05D 1/02* (2020.01)
*G06N 5/04* (2023.01)
*G06N 20/00* (2019.01)

(58) Field of Classification Search
CPC ....... B61L 27/60; B61L 3/008; G05D 1/0223; G06N 5/04; G06N 20/00
USPC .......................................................... 701/20
See application file for complete search history.

(56) References Cited

U.S. PATENT DOCUMENTS

| | | | |
|---|---|---|---|
| 9,517,780 B2 * | 12/2016 | Jung | B61L 3/008 |
| 2013/0018531 A1 * | 1/2013 | Kumar | B61L 15/0058 |
| | | | 701/2 |
| 2015/0142226 A1 * | 5/2015 | Jung | B61L 27/00 |
| | | | 701/20 |
| 2016/0075354 A1 * | 3/2016 | Jung | B61L 27/20 |
| | | | 246/182 R |
| 2017/0190340 A1 * | 7/2017 | Jung | B61L 3/008 |
| 2018/0037243 A1 * | 2/2018 | Danielson | B60W 30/146 |
| 2018/0118238 A1 * | 5/2018 | de Albuquerque Gleizer | |
| | | | B61L 15/0027 |
| 2019/0111951 A1 * | 4/2019 | Tione | B61L 3/008 |
| 2019/0202484 A1 * | 7/2019 | Yamamoto | B61L 25/021 |
| 2021/0107546 A1 * | 4/2021 | Ross | B61L 27/04 |
| 2021/0403063 A1 * | 12/2021 | Gao | B61L 27/16 |
| 2022/0180023 A1 * | 6/2022 | Yang | B61L 27/60 |
| 2023/0182790 A1 * | 6/2023 | Michel | G01P 7/00 |
| | | | 701/19 |

* cited by examiner

METHOD AND SYSTEM FOR STATE FEEDBACK PREDICTIVE CONTROL OF HIGH-SPEED TRAIN BASED ON FORECAST ERROR

CROSS REFERENCE TO RELATED APPLICATION

This application claims the priority of Chinese Patent Application No. 202010331363.9, entitled "Method and System for Predicting and Controlling High-speed Train State Feedback Based on Forecast Error" filed with the Chinese Patent Office on Apr. 24, 2020, which is incorporated herein by reference in its entirety.

TECHNICAL FIELD

The disclosure relates to a high-speed train speed tracking control field, in particular to a method and a system for state feedback predictive control of a high-speed train based on a forecast error.

BACKGROUND

China's high-speed rail has entered a period of rapid development, and high-speed trains play a very important role in the modern transportation. However, since high-speed trains have characteristics of high non-linearity, complicated dynamics, uncertainty, etc. during a running process, running conditions of the high-speed train are very complicated, which makes it very difficult to accurately establish a high-speed train model. A driving process of the high-speed train needs to be better controlled in order that the high-speed train may safely travel on time. Therefore, modeling and control of the high-speed train have become the focus and direction of current research.

During modeling a running process of the high-speed train, a motion equation of the high-speed train is usually constructed according to dynamic characteristics of the high-speed train to obtain a system model of the running process of the high-speed train. However, high nonlinearity and uncertainty of fast-moving high-speed train are difficult to be described with traditional dynamic equations with the high-speed train running faster and faster, air resistance to the high-speed train increasing gradually and a coupling relationship with related equipments being gradually strengthened. With a development of the artificial neural network, it is proposed to model the high-speed train using the neural network. However, a training of the neural network requires a large amount of actual data, which increases time cost and may fall into local optimum.

A classic PID control algorithm is often used to control the running process of the high-speed train. However, the PID control algorithm relies on artificial adjustment for selecting parameters, which is not suitable for complicated process control of the high-speed train. During a development process, a generalized prediction control algorithm is proposed to realize a speed tracking control of the high-speed train. However, calculation of the generalized prediction control algorithm is complicated, which does not perform well in a real-time responsive control system of the high-speed train. Somebody combines an automatic parking control and a fuzzy control of the high-speed train, but since fuzzy rules and membership functions in the fuzzy control are obtained based on experience, it is difficult to perform controls and calculations during the running process of the high-speed train.

SUMMARY

An intention of the present disclosure is to provide a method and a system for state feedback predictive control of a high-speed train based on a forecast error, so as to have features of strong adaptability and easy calculation, and achieve high-precision tracking of a train speed.

In order to achieve the above objectives, the disclosure provides the following technical solution:

A method for state feedback predictive control of a high-speed train based on a forecast error, comprises:

obtaining a speed prediction model of a high-speed train $$\hat{y}_{k+p} = CA^p x_k + \sum_{i=1}^{p} CA^{i-1} Bu_{k+p-i},$$

wherein A, B and C are a first system matrix, a second system matrix and a third system matrix of the high-speed train respectively, $\hat{y}_{k+p}$ is a prediction speed of the train at time k+p, p is a prediction time domain, $x_k$ is a state vector of the train at time k, $u_{k+p-i}$ is a control force of the train at time k+p−i; wherein, the state vector is a state matrix related to train-related parameters;

predicting prediction speeds $\hat{y}_k$ and $\hat{y}_{k+p}$ of the train at times k and k+p according to the speed prediction model;

obtaining an actual speed output value $y_k$ of the train at time k;

determining a speed prediction error at time k according to the prediction speed $\hat{y}_k$ of the train at time k and the actual speed output value $y_k$ of the train at time k;

correcting a prediction speed $\hat{y}_{k+p}$ of the train at time k+p, according to the speed prediction error at time k, to obtain a corrected prediction speed $\hat{y}_{k+p}^c$ of the train;

calculating a control force $u_k$ of the train at time k according to $u_k = \lambda^{-1}(p)[y_{k+p}^r - y_k - Kx_k + \hat{y}_k]$ by taking the corrected prediction speed $\hat{y}_{k+p}^c$ of the train as a given speed $y_{k+p}^r$, wherein, $K = CA^p$ and $$\lambda(p) = \sum_{i=1}^{p} CA^{i-1} B;$$

and applying a control force to the train from time k to time k+p based on the control force $u_k$.

Optionally, before obtaining the speed prediction model of the high-speed train, the method further comprises:

obtaining a system model of the high-speed train $$\begin{cases} x_{k+1} = Ax_k + Bu_k + \gamma_k \\ y_k = Cx_k + Du_k + \omega_k \end{cases},$$

wherein, $x_{k+1}$ and $x_k$ are state vectors at times k+1 and k respectively, $u_k$ is a control force of the train at time k, $y_k$ is a speed of the train at time k, A, B, C and D are a first system matrix, a second system matrix, a third system matrix and a fourth system matrix of the high-speed train respectively, and $\gamma_k$ and $\Omega_k$ are a first noise vector and a second noise vector at time k respectively; and determining a speed prediction model of the high-speed train according to the system model of the high-speed train.

Optionally, before obtaining the speed prediction model of the high-speed train, the method further comprises:
constructing a system model of the high-speed train $$\begin{cases} x_{k+1} = Ax_k + Bu_k + \alpha_k \\ y_k = Cx_k + Du_k + \beta_k \end{cases},$$

wherein, $\alpha_k$ is a process noise, and $\beta_k$ is an output noise;

obtaining real data parameters $u_k$, $y_k$ in a running process of the high-speed train; and solving the first system matrix A, the second system matrix B, the third system matrix C and the fourth system matrix D in the system model of the high-speed train based on the system model and the real data parameters.

Optionally, after obtaining the system model of the high-speed train, and before predicting the speed prediction model of the high-speed train according to the system model of the high-speed train, the method further comprises:
constructing a system model of the high-speed train $$\begin{cases} x_{k+1} = Ax_k + Bu_k + K_0 e_k \\ y_k = Cx_k + Du_k + e_k \end{cases},$$

wherein, $e_k$ is a measurable noise, $K_0$ is a Kalman filter gain matrix;

obtaining real data parameters $u_k$, $y_k$ in the running process of the high-speed train; and solving the first system matrix A, the second system matrix B, the third system matrix C, the fourth system matrix D and the Kalman filter gain matrix $K_0$ in the system model of the high-speed train based on the system model and the real data parameters.

The present disclosure also provides a system for state feedback predictive control of a high-speed train based on a forecast error, comprising:

a speed prediction model obtaining module, configured to obtain a speed prediction model of a high-speed train $$\hat{y}_{k+p} = CA^p x_k + \sum_{i=1}^{p} CA^{i-1} Bu_{k+p-i},$$

wherein A, B and C are a first system matrix, a second system matrix, and a third system matrix of the high-speed train respectively, $\hat{y}_{k+p}$ is a prediction speed of the train at time k+p, p is a prediction time domain, $x_k$ is a state vector of the train at time k, $u_{k+p-i}$ is a control force of the train at time k+p−i; wherein, the state vector is a state matrix related to train-related parameters;

a speed prediction module, configured to predict prediction speeds $\hat{y}_k$ and $\hat{y}_{k+p}$ of the train at times k and k+p according to the speed prediction model;

an actual speed obtaining module, configured to obtain an actual speed output value $y_k$ of the train at time k;

a prediction speed correction module, configured to determine a speed prediction error at time k according to the prediction speed $\hat{y}_k$ of the train at time k and the actual speed output value $y_k$ of the train at time k; and to correct a prediction speed $\hat{y}_{k+p}$ of the train at time k+p, according to the speed prediction error at time k, to obtain a corrected prediction speed $\hat{y}_{k+p}^c$ of train;

a control force determination module, configured to calculate a control force $u_k$ of the train at time k according to $u_k = \lambda^{-1}(p)[y_{k+p}^r - y_k - Kx_k + \hat{y}_k]$ by taking the corrected prediction speed $\hat{y}_{k+p}^c$ of the train as a given speed $y_{k+p}^r$, wherein, $K = CA^p$ and $$\lambda(p) = \sum_{i=1}^{p} CA^{i-1} B;$$

and a control module, configured to apply a control force to the train from time k to time k+p based on the control force $u_k$.

Optionally, the system further comprises:
a high-speed train system model obtaining module, configured to obtain a system model of the high-speed train $$\begin{cases} x_{k+1} = Ax_k + Bu_k + \gamma_k \\ y_k = Cx_k + Du_k + \omega_k \end{cases},$$

wherein, $x_{k+1}$ and $x_k$ are state vectors at times k+1 and k respectively, $u_k$ is a control force of the train at time k, $y_k$ is a speed of the train at time k, A, B, C and D are a first system matrix, a second system matrix, a third system matrix and a fourth system matrix of the high-speed train respectively, and $\gamma_k$ and $\omega_k$ are a first noise vector and a second noise vector at time k, respectively; and a speed prediction model determination module, configured to determine a speed prediction model of the high-speed train according to the system model of the high-speed train.

Optionally, the system further comprises:
a high-speed train system model constructing module, configured to construct a system model of the high-speed train $$\begin{cases} x_{k+1} = Ax_k + Bu_k + \alpha_k \\ y_k = Cx_k + Du_k + \beta_k \end{cases},$$

wherein, $\alpha_k$ is a process noise, and $\beta_k$ is an output noise;

an actual parameter data obtaining module, configured to obtain real data parameters $u_k$, $y_k$ in the running process of the high-speed train; and a system matrix solving module, configured to solve the first system matrix A, the second system matrix B, the third system matrix C and the fourth system matrix D in the system model of the high-speed train based on the system model and the real data parameters.

Optionally, the system further comprises:
a high-speed train system model constructing module, configured to construct a system model of the high-speed train $$\begin{cases} x_{k+1} = Ax_k + Bu_k + K_0 e_k \\ y_k = Cx_k + Du_k + e_k \end{cases},$$

wherein, $e_k$ is a measurable noise, $K_0$ is a Kalman filter gain matrix;

an actual parameter data obtaining module, configured to obtain real data parameters $u_k$, $y_k$ in the running process of the high-speed train; and a system matrix solving module, configured to solve the first system matrix A, the second system matrix B, the third system matrix C, the fourth system matrix D and the Kalman filter gain matrix $K_0$ in the system model of the high-speed train based on the system model and the real data parameters.

According to the specific embodiments provided by the present disclosure, the present disclosure discloses the following technical effects: in the method and the system for state feedback predictive control of the high-speed train based on the forecast error provided by the present disclosure, the system model of the high-speed train may adapt to identification problems in a variety of situations without prior knowledge of probability distribution of data, so as to have higher model accuracy in complicated and changeable environments; and the method and the system for predictive control use state variables as feedback, which enhances an anti-noise ability of the control system and improves tracking accuracy. Moreover, since the predictive model is a pre-determined model, it needs only to put input data into the prediction model during controlling the train, and the calculation process is simple and fast.

BRIEF DESCRIPTION OF THE DRAWINGS

In order to explain the embodiments of the present disclosure or the technical solutions in the conventional art more clearly, drawings used in the embodiments are briefly described below. It is obvious that the drawings described below are only some embodiments of the disclosure, and other drawings may be derived from them without creative effort for a person skilled in the art.

DETAILED DESCRIPTION OF THE EMBODIMENTS

The technical solutions in the embodiments of the present disclosure will be clearly and completely described below in conjunction with the accompanying drawings in the embodiments of the present disclosure. It is obvious that the described embodiments are only some embodiments of the present disclosure, rather than all the embodiments. Based on the embodiments of the present disclosure, all other embodiments obtained by those ordinary skill in the art without creative work shall fall within the protection scope of the present disclosure.

In order to make the above-mentioned objects, features and advantages of the present disclosure more obvious and easy to understand, the present disclosure will be further described in detail below with reference to the accompanying drawings and specific embodiments.

Figure 1:
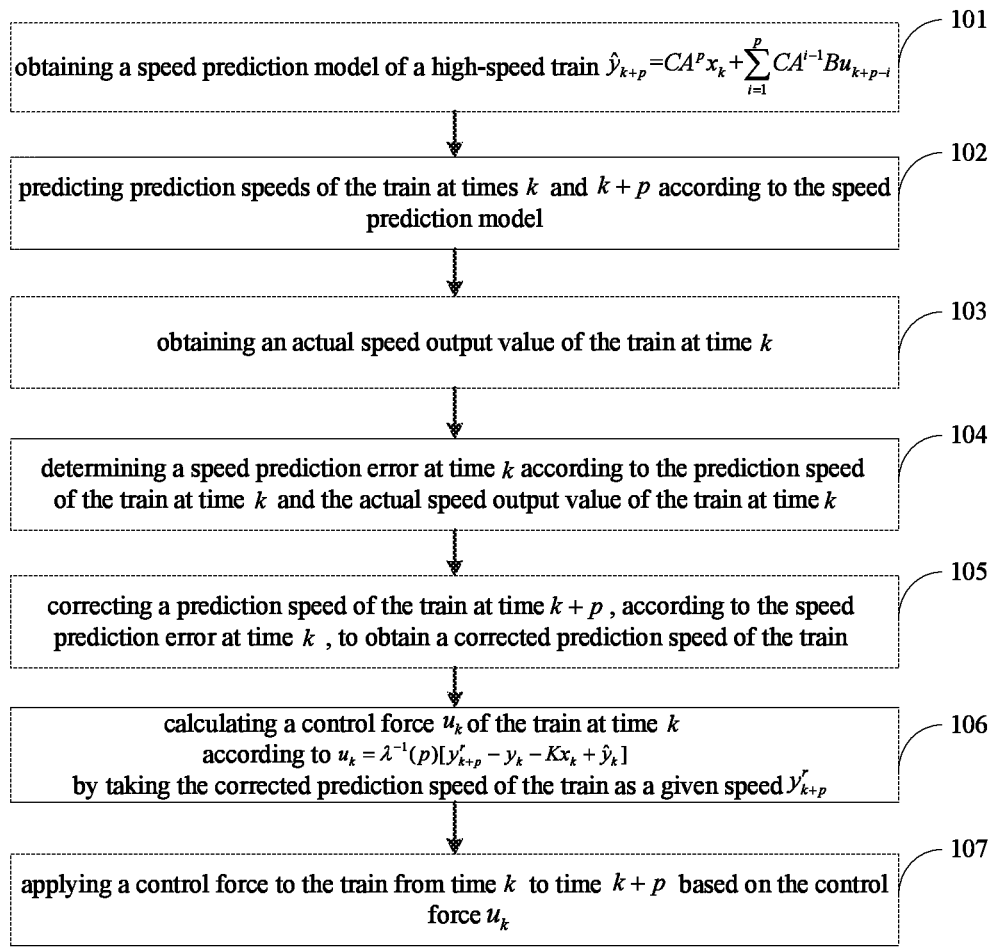
FIG. 1 is a flow chart of a method for state feedback predictive control of a high-speed train based on a forecast error provided by embodiment 1 of the present disclosure.

FIG. 1 is a flow chart of a method for state feedback predictive control of a high-speed train based on a forecast error provided by embodiment 1 of the present disclosure. As shown in FIG. 1, the method comprises the following steps:

Step 101: obtaining a speed prediction model of a high-speed train $$\hat{y}_{k+p} = CA^p x_k + \sum_{i=1}^{p} CA^{i-1} Bu_{k+p-i},$$

wherein A, B and C are the first system matrix, the second system matrix and the third system matrix of the high-speed train respectively, $\hat{y}_{k+p}$ is a prediction speed of the train at time k+p, p is a prediction time domain, $x_k$ is a state vector of the train at time k, and $u_{k+p-i}$ is a control force of the train at time k+p−i; wherein, the state vector is a state matrix related to train-related parameters (style of a train, catenary and rail, material and structure, etc.);

Step 102: predicting prediction speeds $\hat{y}_k$ and $\hat{y}_{k+p}$ of the train at times k and k+p according to the speed prediction model;

Step 103: obtaining an actual speed output value $y_k$ of the train at time k;

Step 104: determining a speed prediction error at time k according to the prediction speed $\hat{y}_k$ of the train at time k and the actual speed output value $y_k$ of the train at time k;

Step 105: correcting a prediction speed $\hat{y}_{k+p}$ of the train at time k+p, according to the speed prediction error at time k, to obtain a corrected prediction speed $\hat{y}_{k+p}^c$ of the train;

Step 106: calculating a control force $u_k$ of the train at time k according to $u_k = \lambda^{-1}(p)[y_{k+p}^r - y_k - Kx_k + \hat{y}_k]$ by taking the corrected prediction speed $\hat{y}_{k+p}^c$ of the train as a given speed $y_{k+p}^r$, wherein, $K = CA^p$ and $$\lambda(p) = \sum_{i=1}^{p} CA^{i-1} B;$$

and

Step 107: applying a control force to the train from time k to time k+p based on the control force $u_k$.

Figure 2:
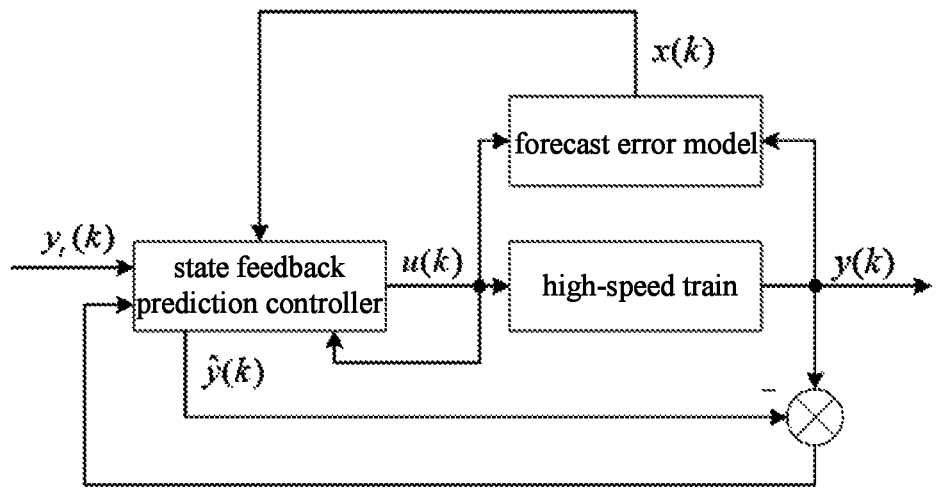
FIG. 2 is a functional block diagram for state feedback predictive control of the high-speed train based on the forecast error in embodiment 1 of the present disclosure.

In an embodiment, the functional block diagram is shown in FIG. 2. A predicted value of the train speed value $y_k$ at the next time k+p is $$\hat{y}_{k+p} = CA^p x_k + \sum_{i=1}^{p} CA^{i-1} Bu_{k+p-i},$$

wherein P is a selected prediction time domain of speed $y_k$; A, B and C are known matrices derived from the system model of the high-speed train $$\begin{cases} x_{k+1} = Ax_k + Bu_k + \gamma_k \\ y_k = Cx_k + Du_k + \omega_k \end{cases},$$

wherein, $x_{k+1}$ and $x_k$ are state vectors at times k+1 and k respectively, $u_k$ is a control force of the train at time k, $y_k$ is a speed of the train at time k, A, B, C and D are the first system matrix, the second system matrix, the third system matrix and the fourth system matrix of the high-speed train respectively, and $\gamma_k$ and $\omega^k$ are the first noise vector and the second noise vector at time k, respectively, wherein the first noise vector and the second noise vector are the vectors set according to the need. The matrices A, B and C are obtained based on the system model of the high-speed train, real data parameters $u_k$, $y_k$ in a running process of the high-speed train and set data $\gamma_k$ and $\omega_k$.

As an implementation, a difference between the actual output $y_k$ and the predicted output $\hat{y}_k$ is used as the speed prediction error at the time k.

The speed prediction error of time k is used to correct the speed prediction value of the next time P. As an implementation, the formula $\hat{y}_{k+p}^c = \hat{y}_{k+p} + y_k - \hat{y}_k$ may be used for feedback correction, wherein:

$$\hat{y}_k = CA^p x_{k-p} + \sum_{i=1}^{p} CA^{i-1} Bu_{k-i}.$$

As an implementation, using a state feedback single-value prediction and control algorithm with a control time domain L=1, the control force is adjusted only at time k, and then the control force is kept (i.e. $u_{k+i}=u_k$, i>0) to make the speed prediction value after the feedback correction equal to the given speed $y_{k+p}^r$. Then there is $y_{k+p}^r = CA^p x_k + y_k - \hat{y}_k + \lambda(p)u_k$, and the control law is:

$u_k = \lambda^{-1}(p)[y_{k+p}^r - y_k - Kx_k + \hat{y}_k]$, wherein: $K=CA^p$, and $$\lambda(p) = \sum_{i=1}^{p} CA^{i-1} B.$$

As an optional implementation, before step 101, the method provided in this embodiment further comprises:
obtaining a system model of the high-speed train $$\begin{cases} x_{k+1} = Ax_k + Bu_k + \gamma_k \\ y_k = Cx_k + Du_k + \omega_k \end{cases},$$

wherein, $x_{k+i}$ and $x_k$ are state vectors at times k+1 and k respectively, $u_k$ is a control force of the train at time k, $y_k$ is the speed of the train at time k, A, B, C and D are the first system matrix, the second system matrix, the third system matrix and the fourth system matrix of the high-speed train respectively, and $\gamma_k$ and $\omega_k$ are the first noise vector and the second noise vector at time k, respectively; and
determining a speed prediction model of the high-speed train according to the system model of the high-speed train.

As an optional implementation, before obtaining the system model of the high-speed train $$\begin{cases} x_{k+1} = Ax_k + Bu_k + \gamma_k \\ y_k = Cx_k + Du_k + \omega_k \end{cases},$$

the method provided in this embodiment further comprises:
constructing a system model of the high-speed train $$\begin{cases} x_{k+1} = Ax_k + Bu_k + \alpha_k \\ y_k = Cx_k + Du_k + \beta_k \end{cases},$$

wherein, $\alpha_k$ is a process noise, $\beta_k$ is an output noise, $\alpha_k$ and $\beta_k$ are noise vectors set according to the need, and $x_0$ is the state vector set according to the actual situation;
obtaining real data parameters $u_k$, $y_k$ in the running process of the high-speed train; and
solving the first system matrix A, the second system matrix B, the third system matrix C and the fourth system matrix D of the system model of the high-speed train based on the system model and the real data parameters. At this time, the system model of the high-speed train $$\begin{cases} x_{k+1} = Ax_k + Bu_k + \gamma_k \\ y_k = Cx_k + Du_k + \omega_k \end{cases}$$

is $$\begin{cases} x_{k+1} = Ax_k + Bu_k + \alpha_k \\ y_k = Cx_k + Du_k + \beta_k \end{cases}.$$

In another implementation, before obtaining the system model of the high-speed train $$\begin{cases} x_{k+1} = Ax_k + Bu_k + \gamma_k \\ y_k = Cx_k + Du_k + \omega_k \end{cases},$$

the method further comprises:
constructing a system model of the high-speed train $$\begin{cases} x_{k+1} = Ax_k + Bu_k + K_0 e_k \\ y_k = Cx_k + Du_k + e_k \end{cases},$$

wherein, $e_k \in R^l$ is a measurable noise, $K_0 \in R^{n \times l}$ is a Kalman filter gain matrix; $x_0$ is a state vector set according to the actual situation;
obtaining real data parameters $u_k$, $y_k$ in the running process of the high-speed train; and
solving the first system matrix A, the second system matrix B, the third system matrix C, the fourth system matrix D and the Kalman filter gain matrix $K_0$ in the system model of the high-speed train based on the system model and the real data parameters. At this time, the speed prediction model is a model determined based on the system model after the Kalman filtering. And A, B, C and $K_0$ are obtained based on the noise vector $e_k$ in the Kalman filtering and the real data parameters $u_k$, $y_k$ in the running process of the train. At this time, the system model of the high-speed train $$\begin{cases} x_{k+1} = Ax_k + Bu_k + \gamma_k \\ y_k = Cx_k + Du_k + \omega_k \end{cases}$$

is $$\begin{cases} x_{k+1} = Ax_k + Bu_k + K_0 e_k \\ y_k = Cx_k + Du_k + e_k \end{cases}.$$

The specific construction process of the system model is as follows:

1) Assuming that a length of a ramp or a curve in the running section of the high-speed train is much larger than the length of the high-speed train, the entire high-speed train may be regarded as a mass point. And the motion equation of the high-speed train may be constructed through dynamic characteristics, then the motion equation of speed and control force of the high-speed train may be obtained:

$$\frac{dy}{dt} + cc_0 + cc_1 y + cc_2 y^2 = cu \tag{1}$$

Wherein, y is a running speed, t is time, c is an acceleration coefficient, u is a traction or a braking force of the high-speed train, $c_0$ is a rolling mechanical resistance coefficient, $c_1$ is another mechanical resistance coefficient, and $c_2$ is an air resistance coefficient.

2) Establish a running process model of the high-speed train based on the forecast error. A state space model of the running process of the high-speed train is established according to the running process of the motor train unit in the present disclosure, wherein, the state space model is a mathematical model of the dynamic system established by the state space analysis, and the state variables of the state space model may well describe the interior dynamic characteristics of the system. The following formula is the high-speed train model equation represented by the state space model:

$$\begin{cases} x_{k+1} = h(x_k, u_k) + \gamma_k \\ y_k = g(x_k, u_k) + \omega_k \end{cases} \tag{2}$$

Wherein, subscript k is a train sampling time; $y_k \in R$ is a train speed; $u_k \in R$ is a control force of the train; $x_k \in R^n$ is a state vector related to the relevant parameters (style of a train, catenary and rail, material and structure, etc.) of the high-speed train; $h(\cdot) \in R^n$ and $g(\cdot) \in R$ are non-linear vector functions; and $\gamma_k \in R^n$ and $\omega_k \in R$ are random unmeasurable noise vectors, which may be set according to the situation.

Formula (2) may accurately describe the dynamic behavior of the high-speed train, but the calculation of nonlinear vector functions is complicated and difficult to solve. Therefore, by means of local modeling ideas, the formula (2) is approximatively regarded as a linear system at its equilibrium operating point $(x_0, u_0)$, and transformed into the state space model described by formula (3):

$$\begin{cases} x_{k+1} \approx Ax_k + Bu_k + \alpha_k \\ y_k \approx Cx_k + Du_k + \beta_k \end{cases} \tag{3}$$

Wherein, $A \in R^{n \times n}$, $B \in R^{n \times 1}$, $C \in R^{1 \times n}$ and $D \in R$ are system matrices of the high-speed train, $\alpha_k \in R^{n \times 1}$ and $\beta_k \in R$ are a process noise and an output noise respectively.

Assuming that the state space model is formula (3), the formula (3) may be transformed into another form by introducing the Kalman filtering into the above model:

$$\begin{cases} x_{k+1} = Ax_k + Bu_k + K_0 e_k \\ y_k = Cx_k + Du_k + e_k \end{cases} \tag{4}$$

Wherein, $e_k \in R^l$ is a measurable noise, and $K_0 \in R^{n \times l}$ is a Kalman filter gain matrix.

3) $e_k$ will be expressed by $y_k$, $x_k$ and $u_k$ which are then put into the state equation (4) to obtain:

$$\begin{aligned} x_{k+1} &= Ax_k + Bu_k + K_0(y_k - Cx_k - Du_k) \\ &= (A - K_0 C)x_k + (B - K_0 D)u_k + K_0 y_k \end{aligned} \tag{5}$$

That is:

$$x_{k+1} = A_{K_0} x_k + B_{K_0} \phi_k \tag{6}$$

Wherein, $A_{K_0} = A - K_0 C$, $B_{K_0} = [B - K_0 D \ K_0]$ and $\phi_k = [u_k \ y_k]^T$.

The output matrix equation is obtained after iteration from formula (4):

$$Y_f = \vartheta_f X_k + H_f U_f + G_f \mu_f \tag{7}$$

Wherein, subscript f is a future moment; $\vartheta_f$ is a generalized observability matrix:

$$\vartheta_f = [C \ CA \ L \ CA^{f-1}]^T \tag{8}$$

According to the input data and the output data in the running process of the high-speed train, the Hankel matrices $U_f$ and $Y_f$ in the future may be obtained:

$$U_f = \begin{bmatrix} u_i & u_{i+1} & L & u_{i+j-1} \\ u_{i+1} & u_{i+2} & L & u_{i+j} \\ M & M & O & M \\ u_{2i-1} & u_{2i} & L & u_{2i+j} \end{bmatrix} \tag{9}$$

$$Y_f = \begin{bmatrix} y_i & y_{i+1} & L & y_{i+j-1} \\ y_{i+1} & y_{i+2} & L & y_{i+j} \\ M & M & O & M \\ y_{2i-1} & y_{2i} & L & y_{2i+j-2} \end{bmatrix}$$

$H_f$ and $G_f$ are the Toeplitz matrices:

$$U_f = \begin{bmatrix} u_k & u_{k+1} & L & u_{k+M-1} \\ u_{k+1} & u_{k+2} & L & u_{k+M} \\ M & M & O & M \\ u_{k+f-1} & u_{k+f} & L & u_{k+f+M-2} \end{bmatrix} \tag{11}$$

The input matrix $U_f$ may also be expressed as:

$$U_f = \begin{bmatrix} u_k & u_{k+1} & L & u_{k+M-1} \\ u_{k+1} & u_{k+2} & L & u_{k+M} \\ M & M & O & M \\ u_{k+f-1} & u_{k+f} & L & u_{k+f+M-2} \end{bmatrix} \tag{11}$$

Similarly, the output matrix $Y_f$ and the noise matrix $\mu_f$ may be obtained:

$$Y_f = \begin{bmatrix} y_k & y_{k+1} & L & y_{k+M-1} \\ y_{k+1} & y_{k+2} & L & y_{k+M} \\ M & M & O & M \\ y_{k+f-1} & y_{k+f} & L & y_{k+f+M-2} \end{bmatrix} \quad (12)$$

$$\mu_f = \begin{bmatrix} e_k & e_{k+1} & L & e_{k+M-1} \\ e_{k+1} & e_{k+2} & L & e_{k+M} \\ M & M & O & M \\ e_{k+f-1} & e_{k+f} & L & e_{k+f+M-2} \end{bmatrix}$$

The state matrix $X_k$ is:

$$X_k = [x_k x_{k+1} L\ x_{k+N-1}] \quad (13)$$

The state equation in formula (6) is iterated p step to obtain:

$$x_k = \bar{L}_p \Phi_p(k) + A_k^p x_{k-p} \quad (14)$$

Wherein, $\bar{L}_p = [B\ A_{K_0} B_{K_0}\ L\ A_{K_0}^{p-1} B_{K_0}]$, the formula (14) is expanded to obtain:

$$X_k = \bar{L}_p \Phi_p(k) + A_{K_0}^p x_{k-p} \quad (15)$$

When the value p in formula (14) is large, $A_{K_0}^p \approx 0$.
Put formula (15) into equation (7):

$$Y_f = \vartheta \bar{L}_p \Phi_p + H_f U_f + G_f \mu_f = H_{fp} \Phi_p + H_f U_f + G_f \mu_f \quad (16)$$

Wherein, $H_{fp} = \vartheta \bar{L}_p$ and $\Phi_p(k) = [\phi_{k-1}\ \phi_{k-2}\ L\ \phi_{k-p}]^T$.

Both sides of formula (15) are simultaneously projected in the orthogonal direction of $U_f$ to eliminate $H_f U_f$ and then multiplied by $\Phi_p^T$. Assuming that $\mu_f$ and $\Phi_p^T$ are irrelevant and $\mu_f \Phi_p^T = 0$, formula (16) may be reduced to:

$$Y_f \prod\nolimits_{U_f}^\perp \Phi_p^T = H_{fp} \Phi_p \prod\nolimits_{U_f}^\perp \Phi_p^T \quad (17)$$

$$\hat{H}_{fp} = Y_f \prod\nolimits_{U_f}^\perp \Phi_p^T \left( \Phi_p \prod\nolimits_{U_f}^\perp \Phi_p^T \right)^{-1}$$

SVD decomposition is performed on $\hat{H}_{fp} \Phi_p$ to obtain:

$$\hat{H}_{fp} \Phi_p = \Gamma \bar{L}_p \Phi_p = U O V^T \approx U_n O_n V_n^T \quad (18)$$

To obtain the generalized observability matrix, assume $$\vartheta = U_n O_n^{1/2} \quad (19).$$

After obtaining a value of the matrix $\vartheta$, then the estimated value of the state matrix is obtained, namely:

$$\hat{x}_k \approx \bar{L}_p \Phi_p(k) = O_n^{1/2} V_n^T \quad (20)$$

Formula (4) is reduced to a least squares solving problem, namely:

$$\begin{pmatrix} \hat{A} & \hat{B} \\ \hat{C} & \hat{D} \end{pmatrix} = \min_{A,B,C,D} \quad (21)$$

$$\left\| \begin{pmatrix} \hat{x}_{k+1} & \hat{x}_{k+2} & L & \hat{x}_{k+j} \\ y_k & y_{k+1} & L & y_{k+j-1} \end{pmatrix} - \begin{pmatrix} A & B \\ C & D \end{pmatrix} \begin{pmatrix} \hat{x}_k & \hat{x}_{k+1} & L & \hat{x}_{k+j-1} \\ u_k & u_{k+1} & L & u_{k+j-1} \end{pmatrix} \right\|_F^2$$

The initial estimated value of the system matrix is calculated by formula (21).

Because the algorithm is in the open-loop state, the calculation process does not consider the direct feedack matrix D (i.e. D=0). The estimated value of y may be:

$$\hat{y}_{k+1} = C\hat{x}_{k+1} = C[(A-K_0 C)\hat{x}_k + Bu_k + K_0 y_k] \quad (22)$$

The estimated value of the error is:

$$\Delta y_{k+1} = y_{k+1} - \hat{y}_{k+1}; \mu = [\Delta y_k, \Delta y_{k+1}, \ldots, \Delta y_{k+M}] \quad (23)$$

Selection error criteria is:

$$J = \det\left[\frac{1}{N}(\mu^T \cdot \mu)\right] \quad (24)$$

That is, the system identification is transformed into:

$$\{A, B, C, D\} = \min_{A,B,C,D} J = \min_{A,B,C,D} \det\left[\frac{1}{N}(\mu^T \cdot \mu)\right] \quad (25)$$

Calculate the final estimated value of the system matrix parameters by formula (25) to minimize the prediction error criterion function.

The model provided by the present disclosure uses the data measured during the running process of the high-speed train to complete the modeling of the high-speed train system. The forecast error method may adapt to identification problems in a variety of situations without prior knowledge of probability distribution of data. The train system model obtained by this method has higher model accuracy in complicated and changeable environments. In terms of control, the whole prediction and controlling system adopts state variables as feedback, thereby enhancing an anti-noise ability of the control system, improving the stability of the control system and tracking accuracy, and achieving a better tracking effect under noise interference.

The method provided by the present disclosure is verified below.

2000 sets of real input and output data in the running process of the high-speed train are obtained based on the train characteristic curve. Wherein, 1500 sets of input and output samples are used for modeling data, and another 500 sets of data are used as testing data to verify the accuracy of the model.

In terms of modeling, 1500 sets of real data from the running process of the high-speed train are used for modeling to obtain the system matrix parameters of the state-space model. In order to verify the accuracy of the model, another 500 sets of data are used to verify the data to verify the model, to obtain model error curve as shown in FIG. 3.

Figure 3:
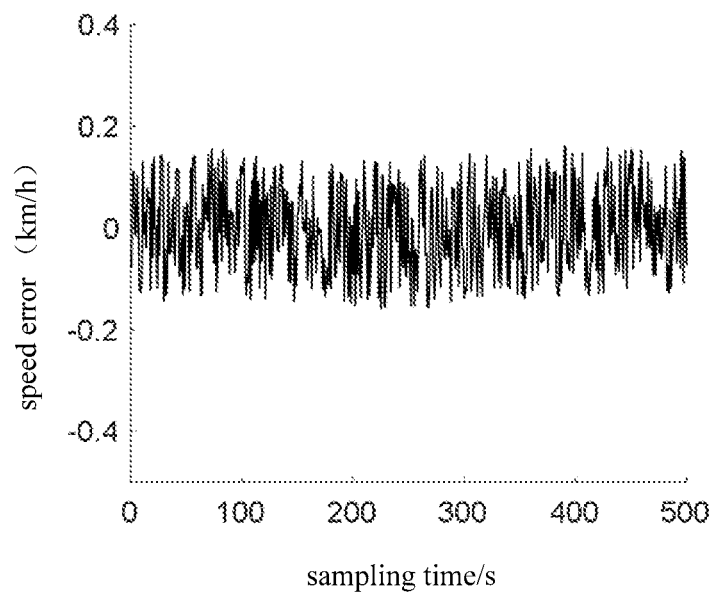
FIG. 3 is an output error distribution curve of testing data in example 1 of the present disclosure.

As shown in FIG. 3, the range of the model error curve is −0.4~0.4 km/h, is kept in a small range and presents a stable fluctuation, thereby meeting the requirements of the running process of the high-speed train.

However, during the actual running process of the high-speed train, the measured data are not completely accurate, and transmission and reception of data will be interfered by noise. Therefore, considering the actual running situation, noises are added to the input data and the output data to perform a simulation again to obtain its model error curve, as shown in FIG. 4.

Figure 4:
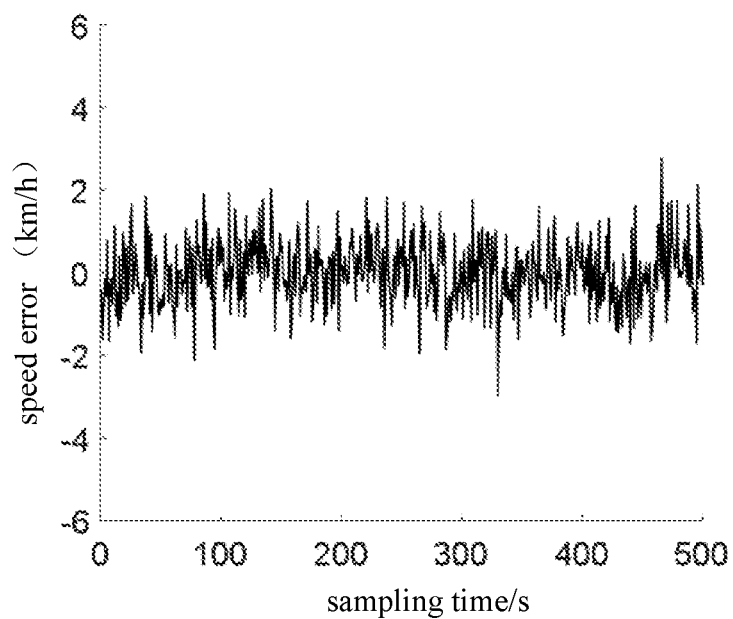
FIG. 4 is an output error distribution curve of the testing data after adding noise to the modeling data in example 1 of the present disclosure.

As shown in FIG. 4, the range of the model error curve is −2~2 km/h, and thus is kept in a small range, and the error fluctuation thereof has no big fluctuations, which indicates that it meets the requirements of the running process of the high-speed trains in the complicated environment.

Figure 5:
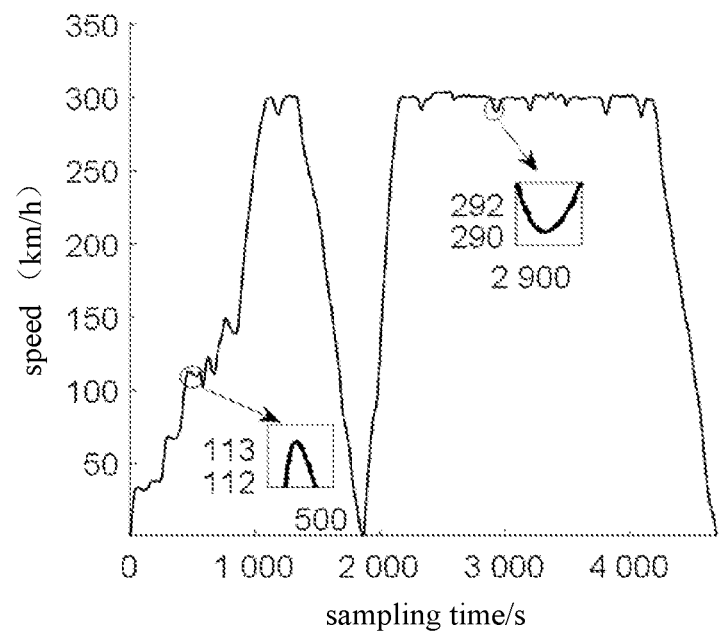
FIG. 5 is a speed tracking curve of real data of the high-speed train in embodiment 1 of the present disclosure.

In terms of control, based on the above-identified state space model, the state feedback predictive control is used to track the speed of the high-speed train in the running process of the high-speed train. The reference trajectory selects 4693 sets of real data during the running process of the high-speed train to obtain its speed tracking curve. As shown in FIG. 5, the solid curve is the reference trajectory, and the dashed curve is the speed tracking.

Figure 6:
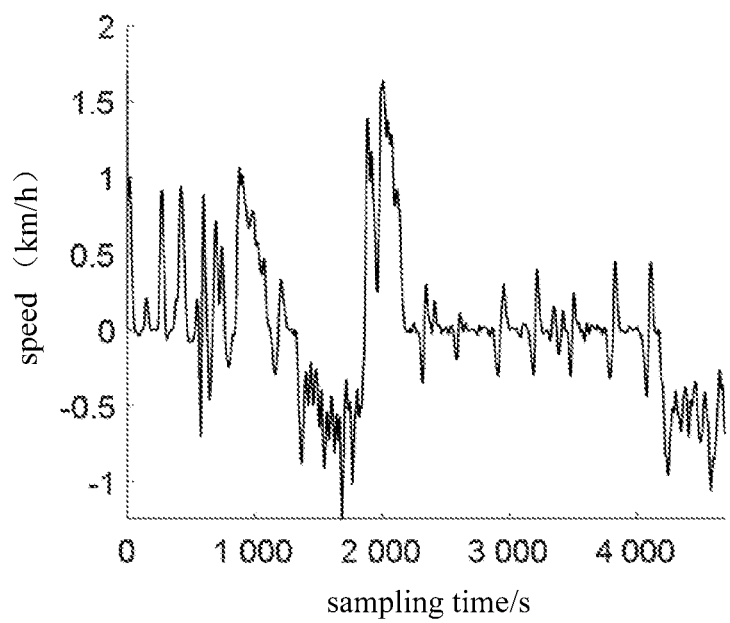
FIG. 6 is a speed tracking error curve of the real data of the high-speed train in embodiment 1 of the present disclosure.

It may be seen from FIG. 5 that the method for the state feedback predictive control of the high-speed train has a good tracking accuracy during the whole running process of the high-speed train. The obtained speed tracking curve and the objective reference trajectory almost fit in the whole running process to achieve an accurate track to the reference trajectory, which indicates that the method has a high-precision tracking performance. It may be seen from FIG. 6 that the specific error of speed tracking in the whole running process, during which, the error value may be kept in a small interval, and fluctuate stably in most intervals to track the objective speed curve with high precision.

Figure 7:
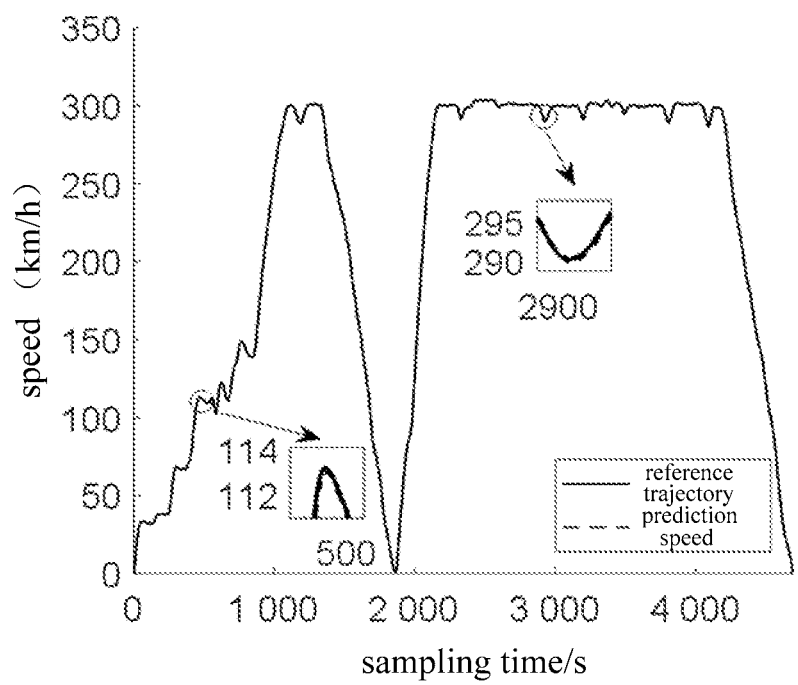
FIG. 7 is a speed tracking curve of the real data of the high-speed train after adding noise to the control process in embodiment 1 of the present disclosure.

However, during the running process of the high-speed train, the high-speed train are inevitably interfered by noises due to the faster speed and the complicated and changeable surrounding environments. Therefore, it is considered to add noise to the control and perform a simulation again to obtain its speed tracking curve. As shown in FIG. 7, the solid curve is the reference trajectory, and the dashed curve is the speed tracking.

Figure 8:
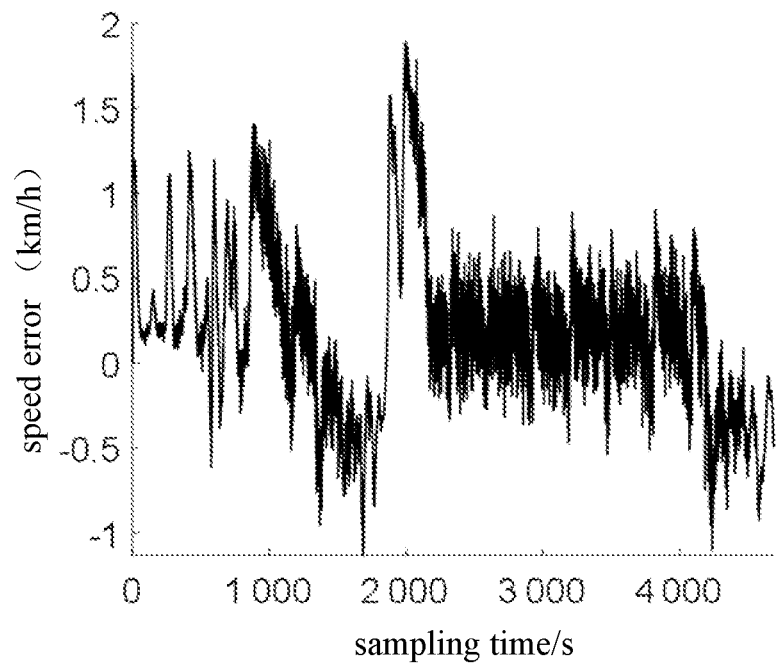
FIG. 8 is a speed tracking error curve of the real data of the high-speed train after adding noise to the control process in embodiment 1 of the present disclosure.

It can be seen from FIG. 7 that in the case of noise interference, the tracking error may still be kept in a good range, which indicates the method has strong adaptability and anti-interference ability under the complicated and changeable environment in the actual running process of the high-speed train. FIG. 8 shows an error curve. It can be seen from FIG. 8 that after adding noise, this method still has good control accuracy, relatively stable error fluctuations and small fluctuations, which indicates the method has a certain anti-interference ability.

Figure 9:
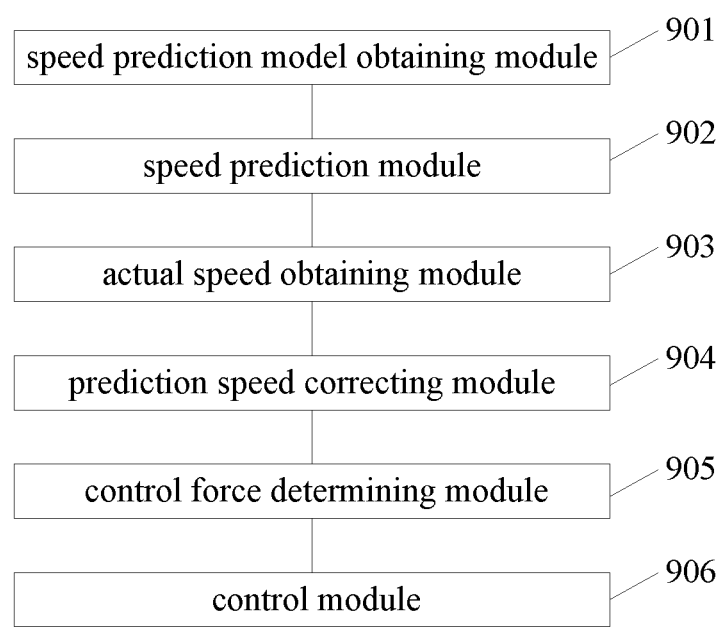
FIG. 9 is a structural diagram of a system for state feedback predictive control of the high-speed train based on a forecast error provided by embodiment 2 of the present disclosure.

FIG. 9 is a structural diagram of a system for state feedback predictive control of a high-speed train based on a forecast error provided by embodiment 2 of the disclosure. As shown in FIG. 9, the system comprises:

a speed prediction model obtaining module 901, configured to obtain a speed prediction model of a high-speed train $$\hat{y}_{k+p} = CA^p x_k + \sum_{i=1}^{p} CA^{i-1} B u_{k+p-i},$$

wherein A, B and C are the first system matrix, the second system matrix, and the third system matrix of the high-speed train respectively, $\hat{y}_{k+p}$ is a prediction speed of the train at time k+p, p is a prediction time domain, $x_k$ is a state vector of the train at time k, and $u_{k+p-i}$ is a control force of the train at time k+p−i; wherein, the state vector is a state matrix related to train-related parameters;

a speed prediction module 902, configured to predict prediction speeds $\hat{y}_k$ and $\hat{y}_{k+p}$ of the train at time k and k+p according to the speed prediction model;

an actual speed obtaining module 903, configured to obtain an actual speed output value $y_k$ of the train at time k;

a prediction speed correction module 904, configured to determine a speed prediction error at time k according to the prediction speed $\hat{y}_k$ of the train at time k and the actual speed output value $y_k$ of the train at time k; and to correct a prediction speed $\hat{y}_{k+p}$ of the train at time k+p, according to the speed prediction error at time k, to obtain a corrected prediction speed $\hat{y}_{k+p}^c$ of the train;

a control force determination module 905, configured to calculate a control force $u_k$ of the train at time k according to $u_k = \lambda^{-1}(p)[y_{k+p}^r - y_k - Kx_k + \hat{y}_k]$ by taking the corrected prediction speed $\hat{y}_{k+p}^c$ of the train as a given speed $y_{k+p}^r$, wherein, $K = CA^p$ and $$\lambda(p) = \sum_{i=1}^{p} CA^{i-1} B;$$

and a control module 906, configured to apply a control force to the train from time k to time k+p based on the control force $u_k$.

As an optional implementation, the system further comprises:

a high-speed train system model obtaining module, configured to obtain a system model of the high-speed train $$\begin{cases} x_{k+1} = Ax_k + Bu_k + \gamma_k \\ y_k = Cx_k + Du_k + \omega_k \end{cases},$$

wherein, $x_{k+1}$ and $x_k$ are state vectors at times k+1 and k, $u_k$ is a control force of the train at time k, $y_k$ is a speed of the train at time k, A, B, C and D are the first system matrix, the second system matrix, the third system matrix and the fourth system matrix of the high-speed train respectively, and $\gamma_k$ and $\omega_k$ are the first noise vector and the second noise vector at time k respectively; and a speed prediction model determination module, configured to determine a speed prediction model of the high-speed train according to the system model of the high-speed train.

As an optional implementation, the system further comprises:

a high-speed train system model constructing module, configured to construct a system model of the high-speed train $$\begin{cases} x_{k+1} = Ax_k + Bu_k + \alpha_k \\ y_k = Cx_k + Du_k + \beta_k \end{cases},$$

wherein, $\alpha_k$ is a process noise, and $\beta_k$ is an output noise;

an actual parameter data obtaining module, configured to obtain real data parameters $u_k$, $y_k$ in the running process of the high-speed train; and a system matrix solving module, configured to solve the first system matrix A, the second system matrix B, the third system matrix C and the fourth system matrix D in the system model of the high-speed train based on the system model and the real data parameters.

In another optional implementation, the system further comprises:

a high-speed train system model constructing module, configured to construct a system model of the high-speed train $$\begin{cases} x_{k+1} = Ax_k + Bu_k + K_0 e_k \\ y_k = Cx_k + Du_k + e_k \end{cases},$$

wherein, $e_k$ is measurable noise, and $K_0$ is a Kalman filter gain matrix;

an actual parameter data obtaining module, configured to obtain real data parameters $u_k$, $y_k$ in the running process of the high-speed train; and a system matrix solving module, configured to solve the first system matrix A, the second system matrix B, the third system matrix C, the fourth system matrix D and the Kalman filter gain matrix $K_0$ in the system model of the high-speed train based on the system model and the real data parameters.

The various embodiments in this specification are described in a progressive manner. Each embodiment focuses on the differences from other embodiments, and the same or similar parts between the various embodiments may be referred to each other. For the system disclosed in the embodiment, since it corresponds to the method disclosed in the embodiment, the description to the system is relatively simple, and the relevant information may be referred to the description of the method part.

Specific examples are used in this application to illustrate the principles and implementation of the present disclosure. The description of the above examples is only used to help understand the method and core idea of the present disclosure; at the same time, for those ordinary skill in the art, there will be changes in the specific implementation and scope of application according to the present disclosure. In summary, the content of this specification should not be construed as limiting the present disclosure.

What is claimed:

1. A method for state feedback predictive control of a high-speed train based on a forecast error, comprising:

obtaining a speed prediction model of the high-speed train $$\hat{y}_{k+p} = CA^p x_k + \sum_{i=1}^{p} CA^{i-1} Bu_{k+p-i},$$

wherein A, B and C are a first system matrix, a second system matrix and a third system matrix of the high-speed train respectively, $\hat{y}_{k+p}$ is a prediction speed of the train at time k+p, p is a prediction time domain, $x_k$ is a state vector of the train at time k, $U_{k+p-i}$ is a control force of the train at time k+p−i; wherein, the state vector is a state matrix related to train-related parameters;

predicting prediction speeds $\hat{y}_k$ and $\hat{y}_{k+p}$ of the train at the times k and k+p according to the speed prediction model;

obtaining an actual speed output value $y_k$ of the train at the time k;

determining a speed prediction error at the time k according to the prediction speed $\hat{y}_k$ of the train at the time k and the actual speed output value $y_k$ of the train at the time k;

correcting the prediction speed $\hat{y}_{k+p}$ of the train at the time k+p, according to the speed prediction error at the time k, to obtain a corrected prediction speed $\hat{y}_{k+p}^c$ of the train;

calculating a control force $u_k$ of the train at the time k according to $u_k = \lambda^{-1}(p)[y_{k+p}^r - y_k - Kx_k + \hat{y}_k]$ by taking the corrected prediction speed $\hat{y}_{k+p}^c$ of the train as a given speed $\hat{y}_{k+p}^r$, wherein $K = CA^p$ and $$\lambda(p) = \sum_{i=1}^{p} CA^{i-1} B;$$

and applying the control force $u_k$ to the train from the time k to the time k+p based on the control force $u_k$.

2. The method for state feedback predictive control of the high-speed train based on the forecast error according to claim 1, wherein, before obtaining the speed prediction model of the high-speed train, the method further comprises:

obtaining a system model of the high-speed train $$\begin{cases} x_{k+1} = Ax_k + Bu_k + \gamma_k \\ y_k = Cx_k + Du_k + \omega_k \end{cases},$$

wherein, $x_{k+1}$ and $x_k$ are state vectors at times k+1 and k respectively, $u_k$ is the control force of the train at the time k, $y_k$ is a speed of the train at the time k, A, B, C and D are a first system matrix, a second system matrix, a third system matrix and a fourth system matrix of the high-speed train respectively, and $\gamma_k$ and $\omega_k$ are a first noise vector and a second noise vector at the time k, respectively; and determining the speed prediction model of the high-speed train according to the system model of the high-speed train.

3. The method for state feedback predictive control of the high-speed train based on the forecast error according to claim 2, wherein, before obtaining the speed prediction model of the high-speed train, the method further comprises:

constructing a second system model of the high-speed train $$\begin{cases} x_{k+1} = Ax_k + Bu_k + \alpha_k \\ y_k = Cx_k + Du_k + \beta_k \end{cases},$$

wherein, $\alpha_k$ is a process noise, and $\beta_k$ is an output noise;

obtaining real data parameters $u_k$, $y_k$ in a running process of the high-speed train; and solving the first system matrix A, the second system matrix B, the third system matrix C and the fourth system matrix D in the second system model of the high-speed train based on the system model and the real data parameters.

4. The method for state feedback predictive control of the high-speed train based on the forecast error according to claim 2, wherein, after obtaining the system model of the high-speed train, and before predicting the speed prediction model of the high-speed train according to the system model of the high-speed train, the method further comprises:

constructing a third system model of the high-speed train $$\begin{cases} x_{k+1} = Ax_k + Bu_k + K_0 e_k \\ y_k = Cx_k + Du_k + e_k \end{cases},$$

wherein, $e_k$ is a measurable noise, $K_0$ is a Kalman filter gain matrix;

obtaining real data parameters $u_k$, $y_k$ in the running process of the high-speed train; and solving the first system matrix A, the second system matrix B, the third system matrix C, the fourth system matrix D and the Kalman filter gain matrix $K_0$ in the third system model of the high-speed train based on the system model and the real data parameters.

* * * * *